(12) United States Patent
Chen et al.

(10) Patent No.: US 11,450,337 B2
(45) Date of Patent: Sep. 20, 2022

(54) MULTI-PERSON SPEECH SEPARATION METHOD AND APPARATUS USING A GENERATIVE ADVERSARIAL NETWORK MODEL

(71) Applicant: TENCENT TECHNOLOGY (SHENZHEN) COMPANY LIMITED, Shenzhen (CN)

(72) Inventors: Lianwu Chen, Shenzhen (CN); Meng Yu, Bellevue, WA (US); Yanmin Qian, Shenzhen (CN); Dan Su, Shenzhen (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 120 days.

(21) Appl. No.: 17/023,829

(22) Filed: Sep. 17, 2020

(65) Prior Publication Data
US 2021/0005216 A1 Jan. 7, 2021

Related U.S. Application Data

(63) Continuation of application No. PCT/CN2019/099216, filed on Aug. 5, 2019.

(30) Foreign Application Priority Data

Aug. 9, 2018 (CN) .......................... 201810904488.9

(51) Int. Cl.
*G10L 21/0272* (2013.01)
*G06N 3/04* (2006.01)
(Continued)

(52) U.S. Cl.
CPC ........ *G10L 21/0272* (2013.01); *G06N 3/0454* (2013.01); *G06N 3/088* (2013.01); *G10L 25/30* (2013.01); *G10L 25/51* (2013.01)

(58) Field of Classification Search
CPC ..... G10L 21/0272; G10L 25/30; G10L 25/51; G10L 25/27; G06N 3/0454; G06N 3/088
See application file for complete search history.

(56) References Cited

U.S. PATENT DOCUMENTS 10,789,921 B2   9/2020 Higurashi
2004/0111260 A1* 6/2004 Deligne .............. G10L 21/0272
                                                  704/E21.012
(Continued)

FOREIGN PATENT DOCUMENTS

CN      103903632 A     7/2014
CN      105096961 A    11/2015
(Continued)

OTHER PUBLICATIONS

The World Intellectual Property Organization (WIPO) International Search Report for PCT/CN2019/099216 dated Oct. 28, 2019 6 Pages (including translation).
(Continued)

*Primary Examiner* — Michael N Opsasnick
(74) *Attorney, Agent, or Firm* — Anova Law Group, PLLC

(57) ABSTRACT

A multi-person speech separation method is provided for a terminal. The method includes extracting a hybrid speech feature from a hybrid speech signal requiring separation, N human voices being mixed in the hybrid speech signal, N being a positive integer greater than or equal to 2; extracting a masking coefficient of the hybrid speech feature by using a generative adversarial network (GAN) model, to obtain a masking matrix corresponding to the N human voices, wherein the GAN model comprises a generative network model and an adversarial network model; and performing a speech separation on the masking matrix corresponding to the N human voices and the hybrid speech signal by using the GAN model, and outputting N separated speech signals corresponding to the N human voices.

16 Claims, 5 Drawing Sheets

(51) Int. Cl.
*G06N 3/08* (2006.01)
*G10L 25/30* (2013.01)
*G10L 25/51* (2013.01)

(56) References Cited

U.S. PATENT DOCUMENTS

| | | | | |
|---|---|---|---|---|
| 2006/0239471 | A1* | 10/2006 | Mao | H04R 29/005 |
| | | | | 381/92 |
| 2015/0088497 | A1* | 3/2015 | Gomez | G10L 21/0208 |
| | | | | 704/226 |
| 2015/0287406 | A1 | 10/2015 | Kristjansson et al. | |
| 2018/0204121 | A1* | 7/2018 | Wang | G06N 3/0454 |
| 2019/0114348 | A1* | 4/2019 | Gao | G06N 3/0472 |
| 2019/0139563 | A1* | 5/2019 | Chen | G06N 3/084 |
| 2019/0318725 | A1* | 10/2019 | Le Roux | G10L 15/063 |
| 2020/0019863 | A1* | 1/2020 | Dua | G06F 16/313 |
| 2020/0227064 | A1 | 7/2020 | Xu et al. | |

FOREIGN PATENT DOCUMENTS

| | | |
|---|---|---|
| CN | 107945811 A | 4/2018 |
| CN | 108109619 A | 6/2018 |
| JP | 2020003537 A | 1/2020 |

OTHER PUBLICATIONS

John R. Hershey et al., "Deep clustering: Discriminative embeddings for segmentation and separation," 2016 IEEE International Conference on Acoustics, Speech and Signal Processing (ICASSP), pp. 31-35. 5 pages.

Dong Yu et al., "Permutation Invariant Training of Deep Models for Speaker-Independent Multi-talker Speech Separation," 2017 IEEE International Conference on Acoustics, Speech and Signal Processing (ICASSP), pp. 241-245. 5 pages.

Ian J. Goodfellow et al., "Generative Adversarial Networks," Advances in Neural Information Processing Systems, 2014, 3:2672-2680. 9 pages.

Santiago Pascual et al., "SEGAN: Speech Enhancement Generative Adversarial Network," 2017, arXiv:1703.09452. 5 pages.

The European Patent Office (EPO) The Extended European Search Report for for 19848216.8, dated Jun. 18, 2021 10 Pages (including translation).

Guangcan Liu et al., "Improving Speech Separation with Adversarial Network and Reinforcement Learning," 2018 International Joint Conference On Neural Networks (IJCNN), Jul. 8, 2018 (Jul. 8, 2018). 7 pages.

Chenxing Li et al., "CBLONN-Based Speaker-Independent Speech Separation Via Generative Adversarial Training," 2018 IEEE International Conference On Acoustics, Speech Ano Signal Processing (ICASSP), Apr. 15, 2018 (Apr. 15, 2018). 5 pages.

Zhe-Cheng Fan et al., "SVSGAN: Singing Voice Separation Via Generative Adversarial Network," 2018 IEEE International Conference On Acoustics, Speech Ano Signal Processing (ICASSP), Apr. 15, 2018 (Apr. 15, 2018). 5 pages.

Meet H Soni et al., "Time-Frequency Masking-Based Speech Enhancement Using Generative Adversarial Network," 2018 IEEE International Conference On Acoustics, Speech Ano Signal Processing (ICASSP), Apr. 15, 2018 (Apr. 15, 2018). 5 pages.

Lianwu Chen et al, "Permutation Invariant Training of Generative Adversarial Network for Monaural Speech Separation," INTERSPEECH 2018, Sep. 2, 2018 (Sep. 2, 2018). 5 pages.

The Japan Patent Office (JPO) Notification of Reasons for Refusal for Application No. 2020-548932 and Translation dated Nov. 1, 2021 6 Pages.

Guangcan Liu et al., "Improving Speech Separation with Adversarial Network and Reinforcement Learning," 2018 International Joint Conference on Neural Networks, Jul. 2018, p. 1-7. 7 pages.

Naohiro Tawara et al., "Adversarial denoising autoencoder for non-linear distortion reduction," Information Processing Society of Japan, Research Report, July 20018, vol. 2018-SLP-123, No. 1, p. 1-7 (well-known art). 7 pages.

Chenxing Li et al., "CBLDNN-Based Speaker-Independent Speech Separation Via Generative Adversarial Training," 2018 IEEE International Conference on Acoustics, Speech and Signal Processing, Apr. 2018, p. 711-715. 5 pages.

* cited by examiner

MULTI-PERSON SPEECH SEPARATION METHOD AND APPARATUS USING A GENERATIVE ADVERSARIAL NETWORK MODEL

RELATED APPLICATIONS

This application is a continuation application of PCT Patent Application No. PCT/CN2019/099216, filed on Aug. 5, 2019, which claims priority to Chinese Patent Application No. 2018109044889, filed with the National Intellectual Property Administration, PRC on Aug. 9, 2018 and entitled "MULTI-PERSON SPEECH SEPARATION METHOD AND APPARATUS", content of all of which is incorporated herein by reference in its entirety.

FIELD OF THE TECHNOLOGY

This application relates to the field of signal processing technologies and, in particular, to a multi-person speech separation method and apparatus.

BACKGROUND

In a noisy acoustic environment such as a cocktail party, there are usually a plurality of different human voices and other noises at the same time. In such an acoustic environment, a human's auditory system can clearly hear target speech to a particular extent. As compared with human beings, a machine is much less adequate in this aspect. Therefore, how to separate target speech from an acoustic environment with a plurality of mixed human voices is a significant research direction in the field of speech signal processing.

A speech denoising solution provided in the related art is mainly applicable to the separation of speech from noise. Because speech and noise have very different characteristics, a related speech denoising solution is adequate for a speech denoising task. Because different speakers have very close speech characteristics, the technical difficulty of speech separation is obviously greater than that of speech denoising. How to separate speech from speech is still to be resolved. The disclosed methods and systems are directed to solve one or more problems set forth above and other problems.

SUMMARY

Embodiments of the present disclosure provide a multi-person speech separation method and apparatus, to separate speech from speech in a multi-person speech scenario.

According to an aspect of the present disclosure, a multi-person speech separation method is provided for a terminal. The method includes extracting a hybrid speech feature from a hybrid speech signal requiring separation, N human voices being mixed in the hybrid speech signal, N being a positive integer greater than or equal to 2; extracting a masking coefficient of the hybrid speech feature by using a generative adversarial network (GAN) model, to obtain a masking matrix corresponding to the N human voices, wherein the GAN model comprises a generative network model and an adversarial network model; and performing a speech separation on the masking matrix corresponding to the N human voices and the hybrid speech signal by using the GAN model, and outputting N separated speech signals corresponding to the N human voices.

According to another aspect of the present disclosure, a multi-person speech separation apparatus is provided. The multi-person speech separation apparatus includes a memory storing computer program instructions, and a processor coupled to the memory. When executing the computer program instructions, the processor is configured to perform: extracting a hybrid speech feature from a hybrid speech signal requiring separation, N human voices being mixed in the hybrid speech signal, N being a positive integer greater than or equal to 2; extracting a masking coefficient of the hybrid speech feature by using a generative adversarial network (GAN) model, to obtain a masking matrix corresponding to the N human voices, wherein the GAN model comprises a generative network model and an adversarial network model; and performing a speech separation on the masking matrix corresponding to the N human voices and the hybrid speech signal by using the GAN model, and outputting N separated speech signals corresponding to the N human voices.

According to another aspect of the present disclosure, a non-transitory computer-readable storage medium is provided. The non-transitory computer-readable storage medium stores computer program instructions executable by at least one processor to perform: extracting a hybrid speech feature from a hybrid speech signal requiring separation, N human voices being mixed in the hybrid speech signal, N being a positive integer greater than or equal to 2; extracting a masking coefficient of the hybrid speech feature by using a generative adversarial network (GAN) model, to obtain a masking matrix corresponding to the N human voices, wherein the GAN model comprises a generative network model and an adversarial network model; and performing a speech separation on the masking matrix corresponding to the N human voices and the hybrid speech signal by using the GAN model, and outputting N separated speech signals corresponding to the N human voices.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person skilled in the art may still derive other drawings from these accompanying drawings.

DETAILED DESCRIPTION

Figure 1:
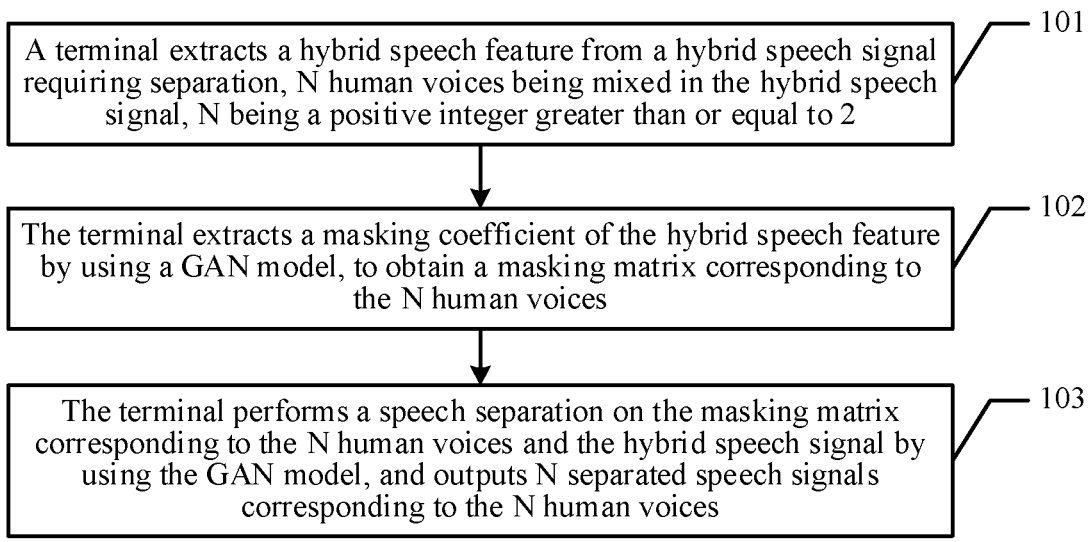
FIG. 1 is a schematic flowchart of a multi-person speech separation method according to an embodiment of the present disclosure.

Embodiments of the present disclosure provide a multi-person speech separation method and apparatus, to separate speech from speech in a multi-person speech scenario.

To make the application objectives, features, and advantages of the present disclosure clearer and more comprehensible, the following describes the technical solutions in the embodiments of the present disclosure with reference to the accompanying drawings. Apparently, the described embodiments are merely some but not all of the embodiments of the present disclosure. Other embodiments obtained by a person skilled in the art based on the embodiments of the present disclosure shall fall within the protection scope of the present disclosure.

The terms "include", "comprise" and any other variants thereof in the specification, claims, and accompanying drawings of the present disclosure are intended to cover a non-exclusive inclusion, so that a process, a method, a system, a product or a device that includes a series of units is not necessarily limited to those units, but may include other units not expressly listed or inherent to such a process, method, product or device.

Certain embodiments of the present disclosure provide a multi-person speech separation method. The embodiments of the present disclosure can separate speech from speech in a multi-person scenario by using a neural network, and are applied to a speech interaction in a complex acoustic scene such as a speech recognition of a smart speaker or a smart television (TV). The embodiments of the present disclosure further provide a multi-person speech separation apparatus. The multi-person speech separation apparatus may be deployed in a terminal in the form of audio processing software. The multi-person speech separation apparatus may be alternatively a server used for storing audio.

A speech separation task performed on a hybrid speech signal in the embodiments of the present disclosure is different from speech denoising in the related art. The speech denoising is removing noise signals included in inputted audio and keeping speech. The speech separation is separating speech belonging to different speakers in the inputted audio. When the inputted audio includes noise and multi-person speech, an output of a speech denoising task is multi-person hybrid speech with the noise removed. An output of the speech separation task is separate speech of each speaker. Whether to separately output or directly remove the noise depends on the design of different speech separation algorithms. From the perspective of the difficulty of processing audio characteristics, because speech and noise have very different characteristics, a related speech denoising solution is adequate for the speech denoising task. Because different speakers have very close speech characteristics, the technical difficulty of speech separation is greater than that of speech denoising.

In the embodiments of the present disclosure, in multi-person speech separation, a generative adversarial network (GAN) model is trained by means of machine learning. The GAN model may be implemented by using a neural network model. For example, the neural network model used in the embodiments of the present disclosure may specifically include a deep neural network (DNN), a long short-term memory (LSTM), and a convolutional neural network (CNN).

A hybrid speech feature is first extracted from a hybrid speech signal requiring separation. The hybrid speech feature is then inputted to a GAN model. The GAN model is used to extract a masking coefficient of the hybrid speech feature to obtain a masking matrix corresponding to N human voices. For example, the masking matrix may be formed by obtaining a masking coefficient of inputted hybrid speech frame-by-frame in each frequency channel. At last, the GAN model is used to perform speech separation on the masking matrix corresponding to the N human voices and the hybrid speech signal, and a plurality of separated speech signals are outputted. In the embodiments of the present disclosure, the GAN model can effectively extract the masking matrix corresponding to the N human voices to perform speech processing. Thus, a speech signal of a single human voice may be automatically separated from a piece of hybrid speech, to implement intelligent recognition of the N human voices that is similar to human hearing.

Referring to FIG. 1, a multi-person speech separation method according to an embodiment of the present disclosure may include the followings.

101. A terminal extracts a hybrid speech feature from a hybrid speech signal requiring separation, and a hybrid speech signal may include a mix of multiple human voices, noises, or other audio signals. For example, N number of human voices may be mixed in the hybrid speech signal, N being a positive integer greater than or equal to 2.

In one embodiment of the present disclosure, a number of sound sources is represented by the letter N. In a speech separation task, the number N of sound sources is greater than or equal to 2. That is, a plurality of human voices may be included in a hybrid speech signal. Speech signals of N human voices may be extracted by using a GAN model.

In one embodiment of the present disclosure, the terminal first obtains a hybrid speech signal requiring separation. A feature corresponding to the hybrid speech signal is first extracted. That is, the hybrid speech feature is obtained. The hybrid speech feature is an inputted feature of the GAN model. During actual application, the hybrid speech feature may be obtained in various manners.

In some embodiments of the present disclosure, the process of extracting the hybrid speech feature from a hybrid speech signal requiring separation includes: extracting a time domain feature or a frequency domain feature of a single-channel speech signal from the hybrid speech signal; extracting a time domain feature or a frequency domain feature of a multi-channel speech signal from the hybrid speech signal; extracting a single-channel speech feature from the hybrid speech signal; or extracting a correlated feature among a plurality of channels from the hybrid speech signal.

In one embodiment of the present disclosure, the hybrid speech signal requiring separation may be collected from a single channel or a plurality of channels. The hybrid speech feature may include one or more of the following features.

For example, a time domain feature or a frequency domain feature of a single-channel/multi-channel speech signal. In another example, the hybrid speech feature may be a single-channel speech feature such as an energy spectrum of log, a Mel Frequency Cepstrum Coefficient (MFCC), sub-band energy, and the like. In another example, the hybrid speech feature may include a correlated feature such as a generalized cross correlation (GCC) feature or a phase difference feature among a plurality of channels. For a feature extraction method of a hybrid audio signal, an extracted feature type and feature content may be determined in combination with a specific scenario.

102. The terminal extracts a masking coefficient of the hybrid speech feature by using a GAN model, to obtain a masking matrix corresponding to the N human voices.

In one embodiment of the present disclosure, the terminal may extract a speech signal of a single human voice in the hybrid speech signal by using the GAN model. After obtaining the hybrid speech feature corresponding to the hybrid speech signal, the hybrid speech feature is inputted to the GAN model. A masking coefficient corresponding to human voices is extracted by using a neural network in the GAN model. For example, the masking matrix may be formed by obtaining a masking coefficient of inputted hybrid speech frame by frame in each frequency channel.

The masking matrix corresponding to N human voices may be generated by using the GAN model, and the masking matrix may be used for the speech separation of a plurality of human voices in the hybrid speech signal. In one embodiment of the present disclosure, the GAN model may be obtained by training the hybrid speech sample and the clean speech sample, and is an effective unsupervised learning method. The generative network model and the discriminative network model are constructed, and trade off with each other in a training process. Eventually, the generative network can generate a result as close as possible to a real target (for example, speech).

103. The terminal performs a speech separation on the masking matrix corresponding to the N human voices and the hybrid speech signal by using the GAN model, and outputs N separated speech signals corresponding to the N human voices.

In one embodiment of the present disclosure, the terminal extracts the masking matrix corresponding to N human voices by using the GAN model, and performs the speech separation on the masking matrix and the hybrid speech signal by using the GAN model. Therefore, separated speech signals belonging to different sound sources are recognized from the hybrid speech signal by using a separation effect of the masking matrix, and the problem that speech of a plurality of human voices cannot be recognized in the related art is solved.

Accordingly, a terminal first extracts a hybrid speech feature from a hybrid speech signal requiring separation, N human voices being mixed in the hybrid speech signal, and then extracts a masking coefficient of the hybrid speech feature by using a GAN model, to obtain a masking matrix corresponding to the N human voices; and the terminal performs a speech separation on the masking matrix corresponding to the N human voices and the hybrid speech signal by using the GAN model, and outputs N separated speech signals corresponding to the N human voices. Because the GAN model used in one embodiment of the present disclosure can extract the masking matrix corresponding to the N human voices, the GAN model can accurately identify speech signals corresponding to a plurality of human voices, and a speech separation network framework is implemented based on the GAN model, to separate speech from speech in a multi-person speech scenario and improve the performance of speech separation.

Next, the training process of the GAN model is described in the followings. In one embodiment of the present disclosure, the GAN model includes at least two network models, namely, a generative network model and a discriminative network model. The generative network model may also be referred to as a generator, and the discriminative network model may also be referred to as a discriminator. The generative network model and the discriminative network model trade off with each other for learning, to generate an adequate output by using the GAN model.

In some embodiments of the present disclosure, before extracting the hybrid speech feature from the hybrid speech signal requiring separation, the multi-person speech separation method may further include the followings.

A1. The terminal obtains a hybrid speech sample and a clean speech sample from a sample database.

A2. The terminal extracts a hybrid speech sample feature from the hybrid speech sample.

A3. The terminal extracts a masking coefficient of the hybrid speech sample feature by using the generative network model, to obtain a sample masking matrix corresponding to the N human voices.

A4. The terminal performs a speech separation on the sample masking matrix and the hybrid speech sample by using the generative network model, and outputs a separated speech sample.

A5. The terminal performs alternate training on the generative network model and the adversarial network model by using the separated speech sample, the hybrid speech sample, and the clean speech sample.

In one embodiment of the present disclosure, the sample database may be set for the training and discrimination of a model. For example, a hybrid speech signal may be used for model training. The "hybrid speech sample" herein is different from the hybrid speech signal in step 101. The hybrid speech sample is sample speech in the sample database. To discriminate an output effect of the generative network model, the clean speech sample is further provided in the sample database. In the training process, the clean speech sample is obtained by superimposing by a plurality of pieces of clean speech.

In the step A2 to step A4, the extraction of the hybrid speech sample feature is the same as the extraction of the feature in step 101. The method for generating the sample masking matrix is similar to that for generating the masking matrix in step 102. The sample masking matrix herein is the masking matrix generated based on the hybrid speech sample feature. Next, the speech separation is performed on the sample masking matrix and the hybrid speech sample by using the generative network model, and the separated speech sample is outputted. In the model training process, two or more sound sources can be used, without limiting.

After the generative network model outputs the separated speech sample, the discriminative network model is then used according to the separated speech sample, the hybrid speech sample, and the clean speech sample to discriminate whether the outputted separated speech sample is the same as the clean speech sample. The discriminative network model is used and an adversarial loss function is introduced to perform alternate training on the generative network model and the discriminative network model repeatedly, thereby better ensuring that the separated speech sample is closer to the clean speech sample.

Figure 2:
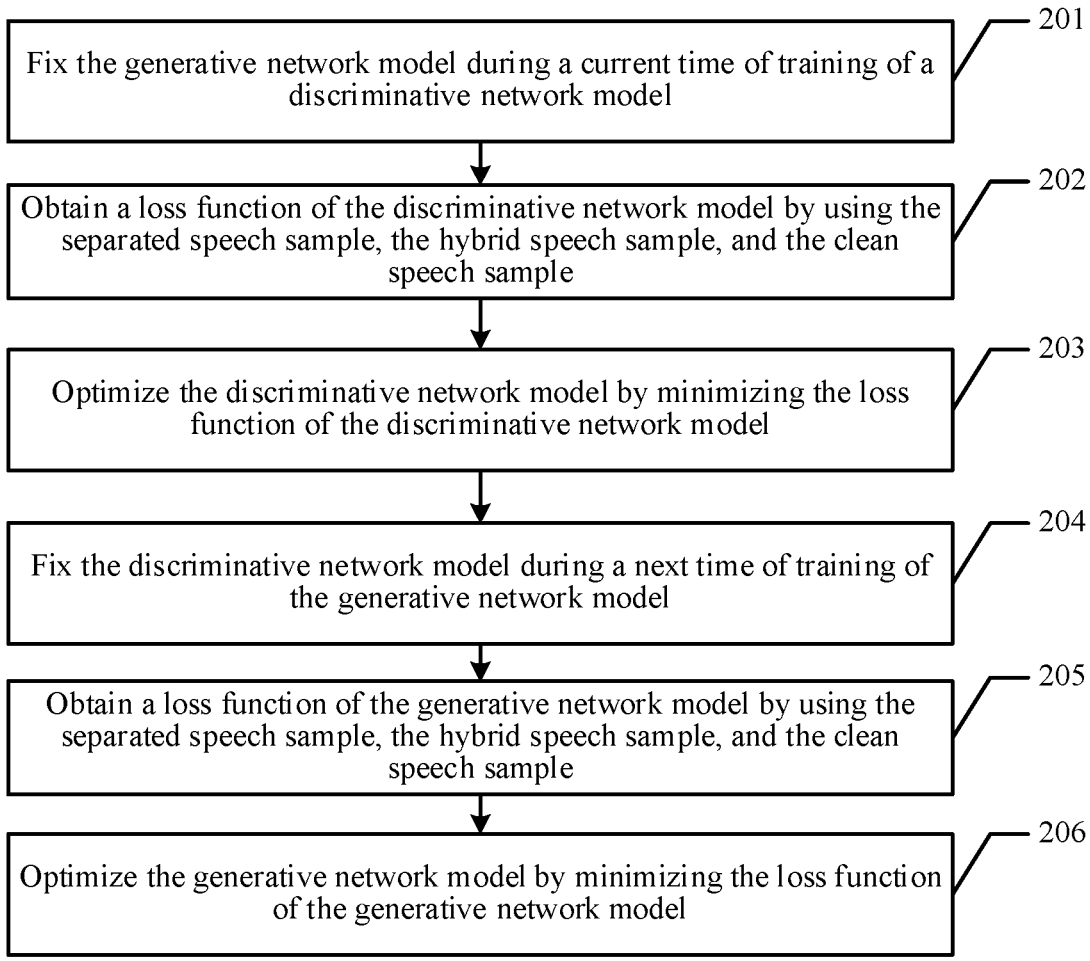
FIG. 2 is a schematic flowchart of a training process of a generative adversarial network (GAN) model according to an embodiment of the present disclosure.

In some embodiments of the present disclosure, referring to FIG. 2, step A5 of performing alternate training on the generative network model and the adversarial network model by using the separated speech sample, the hybrid speech sample, and the clean speech sample includes the following steps.

201. The terminal fixes the generative network model during a current time of training of a discriminative network model.

202. The terminal obtains a loss function of the discriminative network model by using the separated speech sample, the hybrid speech sample, and the clean speech sample.

203. The terminal optimizes the discriminative network model by minimizing the loss function of the discriminative network model.

204. The terminal fixes the discriminative network model during a next time of training of the generative network model.

205. The terminal obtains a loss function of the generative network model by using the separated speech sample, the hybrid speech sample, and the clean speech sample.

206. The terminal optimizes the generative network model by minimizing the loss function of the generative network model.

In one embodiment of the present disclosure, a speech separation training process based on the GAN model by the terminal mainly includes performing alternate training on the generative network model and the adversarial network model. The generative network model is marked as G, and the discriminative network model is marked as D. The generative network model G and the discriminative network model D are first initialized. The training of the discriminative network model in a training process is completed by using step 201 to step 203, and the training of the generative network model in the training process is then completed by using step 204 to step 206. The model training process from step 201 to step 203 and the model training process from step 204 to step 206 are iterated until the GAN model converges. In one embodiment of the present disclosure, a speech separation network framework based on a GAN is provided. The iterative training process of the generative network and the adversarial network is used to improve the performance of the existing speech separation.

From step 201 to step 203, the generative network model G is fixed. Parameters of the discriminative network model are optimized by minimizing the loss function $L_D$ of the discriminative network model.

Step 202 of obtaining a loss function of the discriminative network model by using the separated speech sample, the hybrid speech sample, and the clean speech sample includes the following steps.

2021. The terminal determines a first signal sample combination according to the separated speech sample and the hybrid speech sample, and determines a second signal sample combination according to the clean speech sample and the hybrid speech sample.

2022. The terminal performs discriminative output on the first signal sample combination by using the discriminative network model to obtain a first discriminative output result, and obtains a first distortion metric between the first discriminative output result and a first target output of the discriminative network model.

2023. The terminal performs discriminative output on the second signal sample combination by using the discriminative network model to obtain a second discriminative output result, and obtains a second distortion metric between the second discriminative output result and a second target output of the discriminative network model.

2024. The terminal obtains the loss function of the discriminative network model according to the first distortion metric and the second distortion metric.

In step 2021, for example, the number of sound sources is 2, separated speech samples are represented as $Z_1$ and $Z_2$, a hybrid speech sample is represented as Y, the separated speech samples and the hybrid speech sample are combined to obtain a first signal sample combination, and the first signal sample combination is represented as $[Z_1, Z_2, Y]$. Similarly, a second signal sample combination is represented as $[X_1, X_2, Y]$ and clean speech samples are represented as $X_1$ and $X_2$.

In step 2022, the discriminative network model is marked as D. The discriminative network model is used to perform discriminative output on the first signal sample combination, to obtain a first discriminative output result. The first discriminative output result is represented as $D([Z_1, Z_2, Y])$. The first target output of the discriminative network model is a target output 0 (false). Next, the first distortion metric between the first discriminative output result and the first target output of the discriminative network model is then calculated.

For example, the first distortion metric may be calculated by using the following formula:

$$L_{separated \to false} = \|D([Z_1, Z_2, Y]) - 0\|^2$$

$L_{separated \to false}$ represents a distortion metric between the first target output and a first discriminative output result of a combination $[Z_1, Z_2, Y]$ of the separated speech samples and the hybrid speech sample by using the discriminative network model D.

In step 2023, a discriminative output method is similar to the discriminative output method in step 2022. The terminal performs discriminative output on the second signal sample combination by using the discriminative network model to obtain a second discriminative output result, the second discriminative output result being represented as $D([X_1, X_2, Y])$. The second target output of the discriminative network model is a target output 1 (i.e., true). Further, the second distortion metric between the second discriminative output result and the second target output of the discriminative network model is obtained.

For example, the second distortion metric may be calculated by using the following formula:

$$L_{real \to true} = \|D([X_1, X_2, Y]) - 1\|^2$$

$L_{real \to ture}$ represents a distortion metric between the second target output and a second discriminative output result of a combination $[X_1, X_2, Y]$ of the clean speech samples and the hybrid speech sample by using the discriminative network model D.

In step 2024, after the terminal obtains the first distortion metric and the second distortion metric by using the foregoing steps, the loss function of the discriminative network model may be obtained by using the first distortion metric and the second distortion metric.

For example, a loss function corresponding to an optimization of the discriminative network model may be defined as:

$$L_D = L_{real \to true} + L_{separated \to false}$$

$L_D$ represents the loss function of the discriminative network model, $L_{separated \to false}$ represents a distortion metric between the first target output and a first discriminative output result of a combination $[Z_1, Z_2, Y]$ of the separated speech samples and the hybrid speech sample by using the discriminative network model D, and $L_{real \rightarrow ture}$ represents a distortion metric between the second target output and a second discriminative output result of a combination [$X_1$, $X_2$, Y] of the clean speech samples and the hybrid speech sample by using the discriminative network model D.

From step 204 to step 206, the discriminative network model D is fixed. Parameters of the generative network model are optimized by minimizing the loss function $L_G$ of the generative network model.

Step 205 of obtaining a loss function of the generative network model by using the separated speech sample, the hybrid speech sample, and the clean speech sample includes the following steps.

2051. The terminal determines a first signal sample combination according to the separated speech sample and the hybrid speech sample.

2052. The terminal performs discriminative output on the first signal sample combination by using the discriminative network model to obtain a first discriminative output result, and obtains a third distortion metric between the first discriminative output result and a second target output of the discriminative network model.

2053. The terminal obtains a fourth distortion metric between the separated speech sample and clean speech.

2054. The terminal obtains the loss function of the generative network model according to the third distortion metric and the fourth distortion metric.

In step 2051, for example, the number of sound sources is 2, separated speech samples are represented as $Z_1$ and $Z_2$, a hybrid speech sample is represented as Y, the separated speech sample and the hybrid speech sample are combined to obtain a first signal sample combination, and the first signal sample combination is represented as [$Z_1$, $Z_2$, Y].

In step 2052, the discriminative network model is marked as D. The terminal performs discriminative output on the first signal sample combination by using the discriminative network model to obtain a first discriminative output result, and the first discriminative output result is represented as D([$Z_1$, $Z_2$, Y]). The second target output of the discriminative network model is a target output 1 (true). Next, the third distortion metric between the first discriminative output result and the second target output of the discriminative network model is calculated.

For example, the third distortion metric may be calculated by using the following formula:

$$L_{separated \rightarrow true} = \|D([Z_1, Z_2, Y]) - 1\|^2$$

$L_{separated \rightarrow ture}$ represents a distortion metric between the second target output and a first discriminative output result of a combination [$Z_1$, $Z_2$, Y] of the separated speech samples and the hybrid speech sample by using the discriminative network model D.

In step 2053, the terminal obtains a fourth distortion metric between the separated speech sample and clean speech. The fourth distortion metric is a distortion term of spectrum, which is a distortion metric of the separated speech sample and the clean speech sample.

It is assumed that T is a number of frames in the time domain, F is a number of points in the frequency domain, and S is a number of the sound sources. The fourth distortion metric $J_{ss}$ provided in one embodiment of the present disclosure may be represented as:

$$J_{SS} = \frac{1}{T \times F \times S} \sum_{s=1}^{S} \left\| \hat{M}_s \otimes |Y| - |X_s| \right\|_{F^2}.$$

In some embodiments of the present disclosure, step 2053 of obtaining a fourth distortion metric between the separated speech sample and clean speech includes: performing a permutation invariant calculation on the separated speech sample and the clean speech sample to obtain a correspondence result between the separated speech sample and the clean speech sample; and obtaining the fourth distortion metric according to the correspondence result between the separated speech sample and the clean speech sample.

In a speech separation task, the number of sound sources is greater than 2. It is considered that a correspondence between a separated speech sample and a clean speech sample is not unique. That is, $Z_1$ may correspond to $X_1$, and $Z_2$ may correspond to $X_2$. Alternatively, $Z_1$ may correspond to $X_2$, and $Z_2$ may correspond to $X_1$. Therefore, the permutation invariant calculation needs to be performed for the separated speech sample and the clean speech sample. That is, a permutation invariant training (PIT) may be introduced in the definition of $J_{ss}$. A distortion term $J_{\varphi^*}$ of spectrum corresponding to PIT is:

$$J_{\phi*} = \frac{1}{T \times F \times S} \sum_{s=1}^{S} \left\| \hat{M}_s \otimes |Y| - |X_{\phi*(s)}| \right\|_{F^2}.$$

It is assumed that combinations of all the correspondences form a set P, and φ* represents a correspondence when the minimum distortion is obtained in the set P, $$\phi^* = \arg \min_{\phi \in p} \sum_{s=1}^{S} \left\| \hat{M}_s \otimes |Y| - |X_{\phi(s)}| \right\|_{F^2}.$$

arg min f(x) is a set of all independent variables x that enable a function f(x) to obtain the minimum value.

In step 2054, after the terminal obtains the third distortion metric and the fourth distortion metric by using the foregoing steps, the loss function of the generative network model may be obtained by using the third distortion metric and the fourth distortion metric.

For example, a loss function corresponding to an optimization of the generative network model may be defined as:

$$L_G = J_{SS} + \lambda \times L_{separated \rightarrow true}$$

$L_G$ represents the loss function of the generative network, $L_{separated \rightarrow ture}$ represents a distortion metric between the second target output and a first discriminative output result of a combination [$Z_1$, $Z_2$, Y] of the separated speech samples and the hybrid speech sample by using the discriminative network model D, $J_{ss}$ represents the fourth distortion metric, and λ is a weighting factor.

It may be learned from the foregoing descriptions of one embodiment of the present disclosure that, in one embodiment of the present disclosure, a speech separation network framework based on the GAN is provided. The iterative training process of the generative network and the adversarial network is used to improve the performance of existing speech separation.

For better understanding and implementation of the foregoing solutions in the embodiments of the present disclosure, a corresponding application scenario is used as an example below for specific description.

Figure 3:
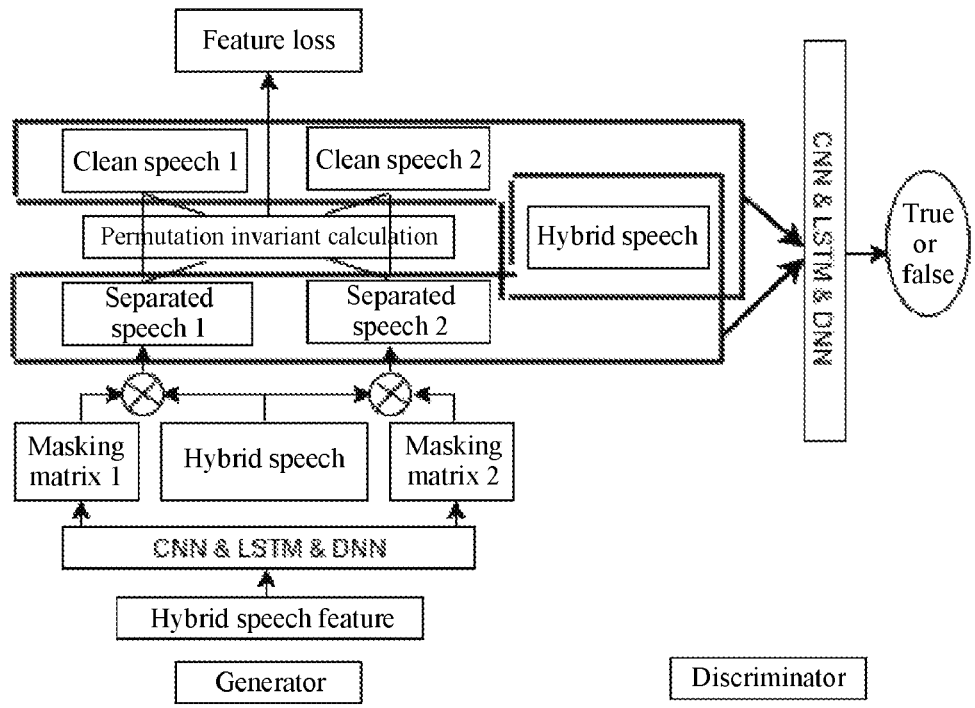
FIG. 3 is a schematic diagram of a model architecture of a GAN model according to an embodiment of the present disclosure.

FIG. 3 is a schematic diagram of a model architecture of a GAN model according to an embodiment of the present disclosure. A speech separation network structure of the GAN model is described below in detail.

In the speech separation network structure based on the GAN according to an embodiment of the present disclosure, an input of the generative network model G is the hybrid speech feature corresponding to the hybrid speech signal. By using neural networks (DNN, LSTM, CNN, and the like), time-frequency point masking matrices M1 and M2 (mask 1 and mask 2) corresponding to separated speech signals are obtained. Frequency spectrums $Z_1$ and $Z_2$ corresponding to the separated speech signals may be obtained by multiplying the masking matrices by a spectrum Y of the hybrid speech signal separately, to meet the following calculation formula:

$$Z_i = M_i * Y, i=1 \text{ or } 2.$$

An input of the adversarial network model is the combination $[Z_1, Z_2, Y]$ of the separated speech signals and the hybrid speech signal, or the combination $[X_1, X_2, Y]$ of the clean speech signals and the hybrid speech signal, and an output is 0 or 1. In the training process, the hybrid speech signal is obtained by superimposing a plurality of pieces of clean speech. Therefore, the frequency spectrums $X_1$ and $X_2$ corresponding to the clean speech are known.

For a training process of a generator and a discriminator, reference may be made to the descriptions in the foregoing embodiments. Details are not described herein again.

To make the description simple, the foregoing method embodiments are stated as a series of action combinations. However, a person skilled in the art needs to know that the present disclosure is not limited to the described sequence of the actions because according to the present disclosure, some steps may be performed in another sequence or may be simultaneously performed. Second, a person skilled in the art also needs to know that the embodiments described in the specification are all optional embodiments and the related actions and modules are not essential in the present disclosure.

For the convenience of a better implementation of the foregoing solutions of the embodiments of the present disclosure, the following further provides a related apparatus on the terminal.

Figure 4A:
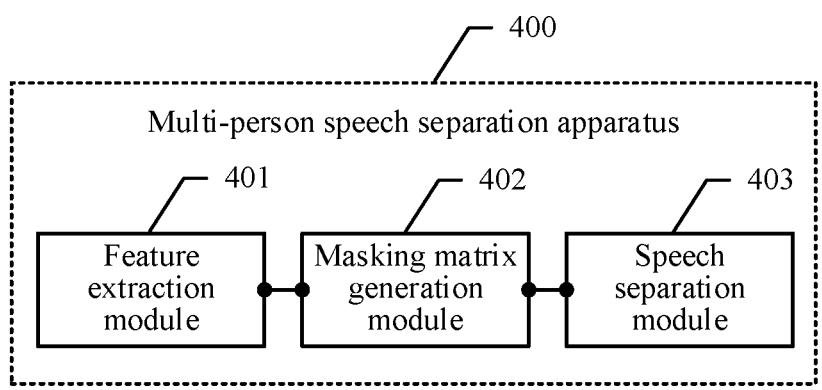
FIG. 4A is a schematic structural diagram of the components of a multi-person speech separation apparatus according to an embodiment of the present disclosure.

Referring to FIG. 4A, an embodiment of the present disclosure provides a multi-person speech separation apparatus 400. The multi-person speech separation apparatus 400 may include a feature extraction module 401, a masking matrix generation module 402, and a speech separation module 403.

The feature extraction module 401 is configured to extract a hybrid speech feature from a hybrid speech signal requiring separation, N human voices being mixed in the hybrid speech signal, N being a positive integer greater than or equal to 2.

The masking matrix generation module 402 is configured to extract a masking coefficient of the hybrid speech feature by using a GAN model, to obtain a masking matrix corresponding to the N human voices.

The speech separation module 403 is configured to: perform a speech separation on the masking matrix corresponding to the N human voices and the hybrid speech signal by using the GAN model, and output N separated speech signals corresponding to the N human voices.

Figure 4B:
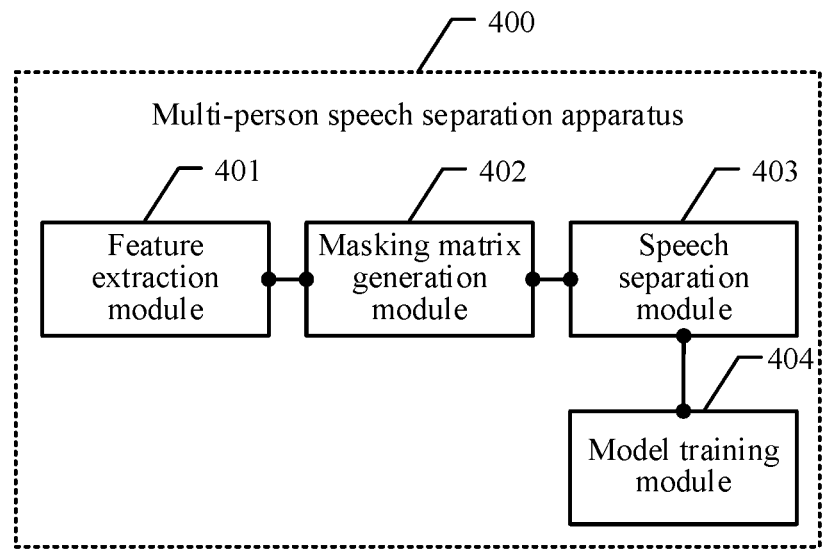
FIG. 4B is a schematic structural diagram of the components of a multi-person speech separation apparatus according to an embodiment of the present disclosure.

In some embodiments of the present disclosure, the GAN model includes a generative network model and an adversarial network model. Referring to FIG. 4B, the multi-person speech separation apparatus 400 further includes a model training module 404.

The feature extraction module 401 is further configured to: before the hybrid speech feature is extracted from the hybrid speech signal requiring separation, obtain a hybrid speech sample and a clean speech sample from a sample database; and extract a hybrid speech sample feature from the hybrid speech sample.

The masking matrix generation module 402 is further configured to extract a masking coefficient of the hybrid speech sample feature by using the generative network model, to obtain a sample masking matrix corresponding to the N human voices.

The speech separation module 403 is further configured to: perform a speech separation on the sample masking matrix and the hybrid speech sample by using the generative network model, and output a separated speech sample.

The model training module 404 is configured to perform alternate training on the generative network model and the adversarial network model by using the separated speech sample, the hybrid speech sample, and the clean speech sample.

Figure 4C:
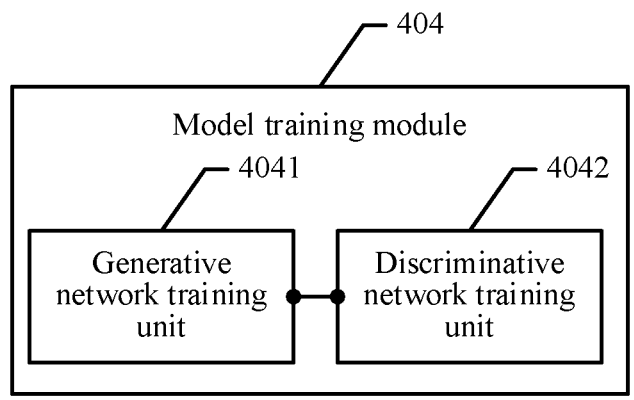
FIG. 4C is a schematic structural diagram of the components of a model training module according to an embodiment of the present disclosure.

In some embodiments of the present disclosure, referring to FIG. 4C, the model training module 404 includes: a generative network training unit 4041, and a discriminative network training unit 4042.

The generative network training unit 4041 is configured to: fix the generative network model during a current time of training of a discriminative network model; obtain a loss function of the discriminative network model by using the separated speech sample, the hybrid speech sample, and the clean speech sample; and optimize the discriminative network model by minimizing the loss function of the discriminative network model.

The discriminative network training unit 4042 is configured to: fix the discriminative network model during a next time of training of the generative network model; obtain a loss function of the generative network model by using the separated speech sample, the hybrid speech sample, and the clean speech sample; and optimize the generative network model by minimizing the loss function of the generative network model.

Figure 4D:
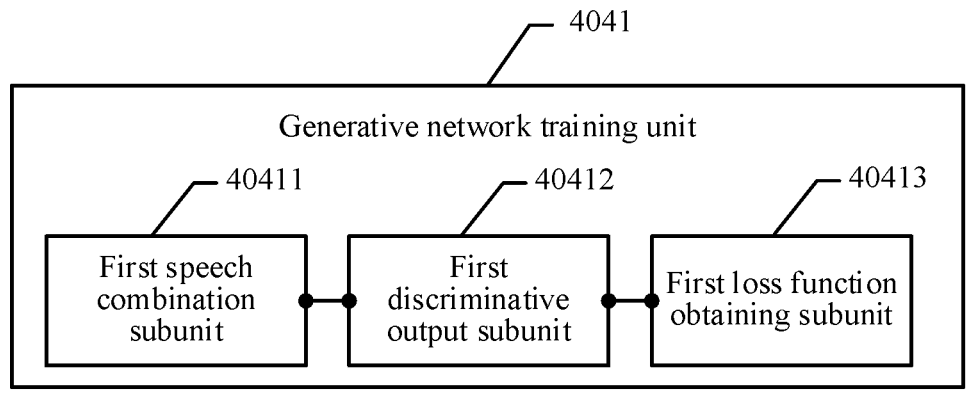
FIG. 4D is a schematic structural diagram of the components of a generative network training unit according to an embodiment of the present disclosure.

In some embodiments of the present disclosure, referring to FIG. 4D, the generative network training unit 4041 includes: a first speech combination subunit 40411, a first discriminative output subunit 40412, and a first loss function obtaining subunit 40413.

The first speech combination subunit 40411 is configured to: determine a first signal sample combination according to the separated speech sample and the hybrid speech sample, and determine a second signal sample combination according to the clean speech sample and the hybrid speech sample.

The first discriminative output subunit 40412 is configured to: perform discriminative output on the first signal sample combination by using the discriminative network model to obtain a first discriminative output result, and obtain a first distortion metric between the first discriminative output result and a first target output of the discriminative network model; and perform discriminative output on the second signal sample combination by using the discriminative network model to obtain a second discriminative output result, and obtain a second distortion metric between the second discriminative output result and a second target output of the discriminative network model.

The first loss function obtaining subunit 40413 is configured to obtain the loss function of the discriminative network model according to the first distortion metric and the second distortion metric.

Figure 4E:
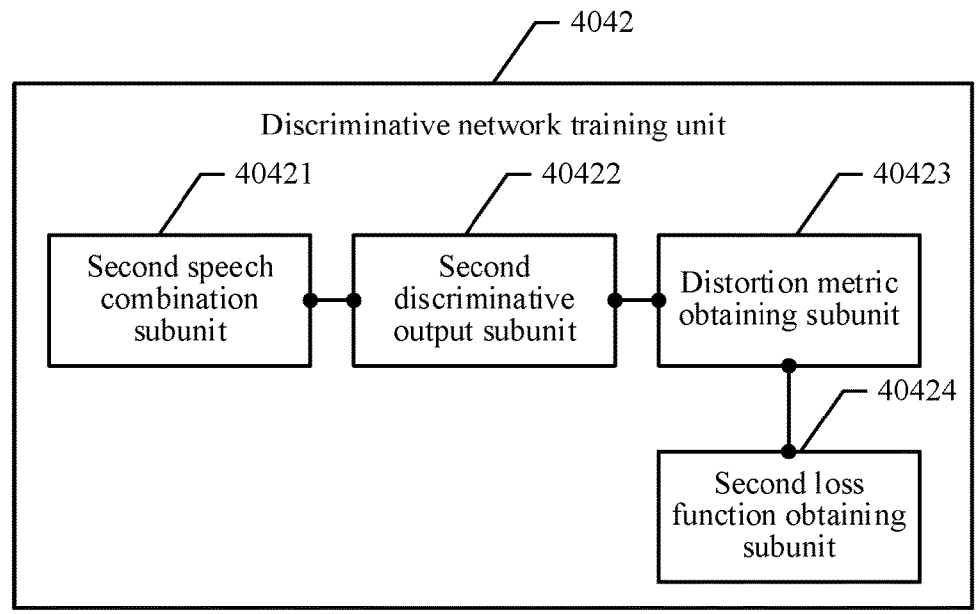
FIG. 4E is a schematic structural diagram of the components of a discriminative network training unit according to an embodiment of the present disclosure.

In some embodiments of the present disclosure, referring to FIG. 4E, the discriminative network training unit 4042 includes: a second speech combination subunit 40421, a second discriminative output subunit 40422, a distortion metric obtaining subunit 40423, and a second loss function obtaining subunit 40424.

The second speech combination subunit 40421 is configured to determine a first signal sample combination according to the separated speech sample and the hybrid speech sample.

The second discriminative output subunit 40422 is configured to: perform discriminative output on the first signal sample combination by using the discriminative network model to obtain a first discriminative output result, and obtain a third distortion metric between the first discriminative output result and a second target output of the discriminative network model.

The distortion metric obtaining subunit 40423 is configured to obtain a fourth distortion metric between the separated speech sample and clean speech.

The second loss function obtaining subunit 40424 is configured to obtain the loss function of the generative network model according to the third distortion metric and the fourth distortion metric.

In some embodiments of the present disclosure, the distortion metric obtaining subunit 40423 is specifically configured to: perform a permutation invariant calculation on the separated speech sample and the clean speech sample to obtain a correspondence result between the separated speech sample and the clean speech sample; and obtain the fourth distortion metric according to the correspondence result between the separated speech sample and the clean speech sample.

In some embodiments of the present disclosure, the feature extraction module 401 is specifically configured to: extract a time domain feature or a frequency domain feature of a single-channel speech signal from the hybrid speech signal; extract a time domain feature or a frequency domain feature of a multi-channel speech signal from the hybrid speech signal; extract a single-channel speech feature from the hybrid speech signal; or extract a correlated feature among a plurality of channels from the hybrid speech signal.

According to the disclosed embodiments, a terminal first extracts a hybrid speech feature from a hybrid speech signal requiring separation, N human voices being mixed in the hybrid speech signal, and then extracts a masking coefficient of the hybrid speech feature by using a GAN model, to obtain a masking matrix corresponding to the N human voices; and the terminal performs a speech separation on the masking matrix corresponding to the N human voices and the hybrid speech signal by using the GAN model, and outputs N separated speech signals corresponding to the N human voices. Because the GAN model can extract the masking matrix corresponding to the N human voices, the GAN model can accurately identify speech signals corresponding to a plurality of human voices, and a speech separation network framework is implemented based on the GAN model, to separate speech from speech in a multi-person speech scenario and improve the performance of speech separation.

Figure 5:
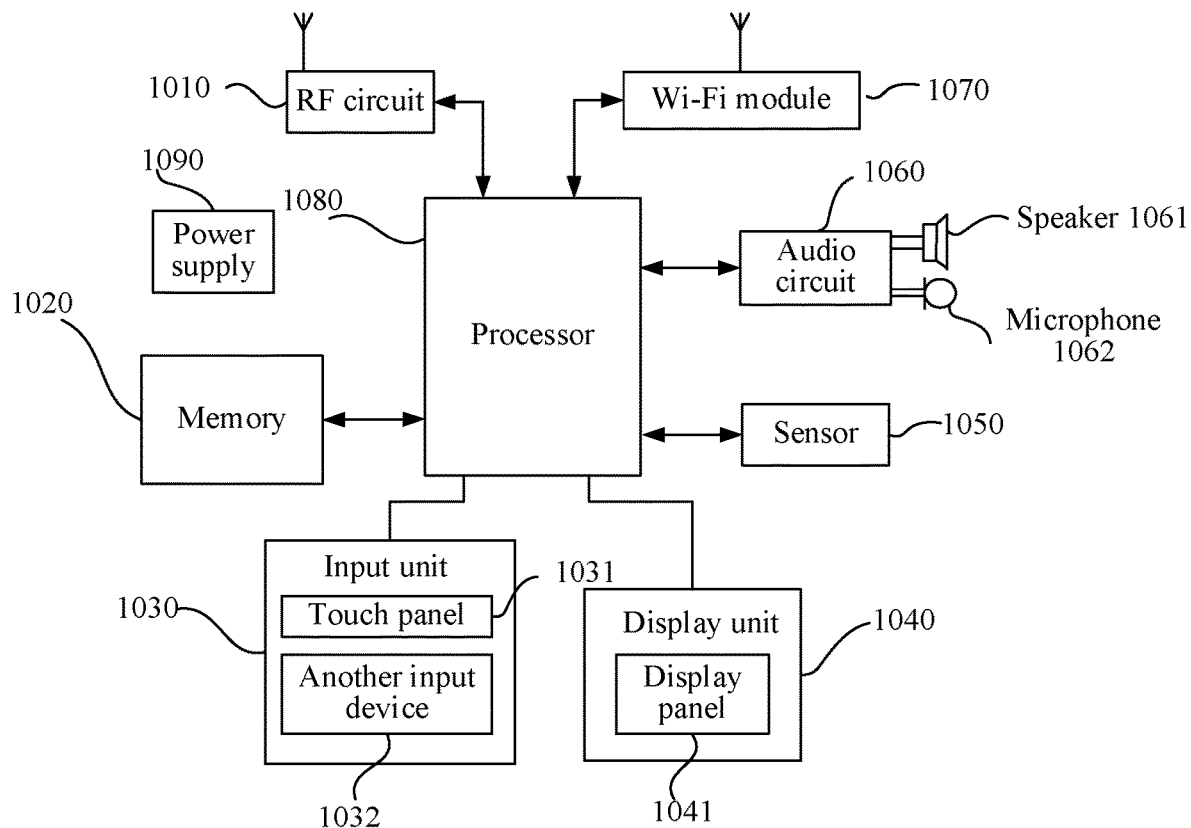
FIG. 5 is a schematic structural diagram of a terminal to which a multi-person speech separation method is applied according to an embodiment of the present disclosure.

An embodiment of the present disclosure further provides another terminal. As shown in FIG. 5, for ease of description, only parts related to the embodiments of the present disclosure are shown. For specific technical details that are not disclosed, refer to the method part in the embodiments of the present disclosure. The terminal may be any terminal device, including a mobile phone, a tablet computer, a personal digital assistant (PDA), a point of sales (POS), and an in-vehicle computer. For example, the terminal is a mobile phone.

FIG. 5 is a partial structural block diagram of a mobile phone related to a terminal according to an embodiment of the present disclosure. Referring to FIG. 5, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the structure of the mobile phone shown in FIG. 5 does not constitute a limitation on the mobile phone, and the mobile phone may include more components or fewer components than those shown in the figure, or some components may be combined, or a different component deployment may be used.

The components of the mobile phone are described below in detail with reference to FIG. 5.

The RF circuit 1010 may be configured to receive and send signals during an information receiving and sending process or a call process. Particularly, the RF circuit 1010 receives downlink information from a base station, then delivers the downlink information to the processor 1080 for processing, and sends related uplink data to the base station. Generally, the RF circuit 1010 includes, but is not limited to, an antenna, at least one amplifier, a transceiver, a coupler, a low noise amplifier (LNA), and a duplexer. In addition, the RF circuit 1010 may further communicate with a network and another device through wireless communication. The wireless communication may use any communication standard or protocol, including but not limited to Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and a module. The processor 1080 runs the software program and module stored in the memory 1020, to implement various functional applications and data processing of the mobile phone. The memory 1020 may mainly include a program storage area and a data storage area. The program storage area may store an operating system (OS), an application program required for at least one function (such as an audio playing function and an image playing function), and the like. The data storage area may store data (such as audio data and a phone book) created according to the use of the mobile phone. In addition, the memory 1020 may include a high speed random access memory (RAM), and may further include a non-volatile memory such as at least one magnetic disk memory device, a flash memory device or another non-volatile solid state memory device.

The input unit 1030 may be configured to receive an entered numeral or character information, and generate key signal input related to user setting and function control of the mobile phone. The input unit 1030 may include a touch panel 1031 and another input device 1032. The touch panel 1031, also referred to as a touchscreen, may collect a touch operation of a user on or near the touch panel 1031 (for example, an operation of a user on the touch panel 1031 or near the touch panel 1031 by using any suitable object or accessory such as a finger or a stylus), and drive a corresponding connection apparatus according to a preset program. Optionally, the touch panel 1031 may include two parts, namely, a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1080. Moreover, the touch controller can receive and execute a command sent from the processor 1080. In addition, the touch panel 1031 may be a touch panel of a resistive, capacitive, infrared, or surface acoustic wave type. The input unit 1030 may include another input devices 1032 in addition to the touch panel 1031. The another input device 1032 may include, but is not limited to, one or more of a physical keyboard, a functional key (such as a volume control key or a switch key), a track ball, a mouse, and a joystick.

The display unit 1040 may be configured to display information inputted by the user or information provided for the user, and various menus of the mobile phone. The display unit 1040 may include a display panel 1041. Optionally, the display panel 1041 may be configured by using a liquid crystal display (LCD), an organic light-emitting diode (OLED) or the like. The touch panel 1031 may cover the display panel 1041. After detecting a touch operation on or near the touch panel 1031, the touch panel 1031 transfers the touch operation to the processor 1080, to determine the type of a touch event. Next, the processor 1080 provides a corresponding visual output on the display panel 1041 according to the type of the touch event. In FIG. 5, the touch panel 1031 and the display panel 1041 are two independent components configured to implement input and input functions of the mobile phone. However, in some embodiments, the touch panel 1031 and the display panel 1041 may be integrated to implement the input and output functions of the mobile phone.

The mobile phone may further include at least one sensor 1050, for example, a light sensor, a motion sensor, and other sensors. The optical sensor may include an ambient light sensor and a proximity sensor. The ambient light sensor may adjust the brightness of the display panel 1041 according to the brightness of the ambient light. The proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, thermometer, and an infrared sensor, which may be configured in the mobile phone. Details are not described herein again.

The audio circuit 1060, a speaker 1061, and a microphone 1062 may provide audio interfaces between the user and the mobile phone. The audio circuit 1060 may convert received audio data into an electrical signal and transmit the electrical signal to the speaker 1061. The speaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Next, the processor 1080 sends the audio data to, for example, another mobile phone by using the RF circuit 1010, or outputs the audio data to the memory 1020 for further processing.

Wi-Fi is a short distance wireless transmission technology. The mobile phone may help, by using the Wi-Fi module 1070, a user to receive and transmit an email, browse a web page, access stream media, and the like. This provides wireless broadband Internet access for the user. Although FIG. 5 shows the Wi-Fi module 1070, it may be understood that the Wi-Fi module 1070 is not a necessary component of the mobile phone, and the Wi-Fi module 1070 may be omitted as required provided that the scope of the essence of the present disclosure is not changed.

The processor 1080 is the control center of the mobile phone, and is connected to various parts of the entire mobile phone by using various interfaces and wires. By running or executing a software program and/or module stored in the memory 1020 and invoking data stored in the memory 1020, the processor 1080 executes various functions of the mobile phone and performs data processing, thereby monitoring the entire mobile phone. Optionally, the processor 1080 may include one or more processing units. Optionally, the processor 1080 may integrate an application processor and a modem processor. The application processor mainly processes an OS, a user interface, an application program, and the like. The modem processor mainly processes wireless communication. It may be understood that the foregoing modem processor may be alternatively not integrated into the processor 1080.

The mobile phone further includes the power supply 1090 (such as a battery) for supplying power to the components. Optionally, the power supply may be logically connected to the processor 1080 by a power management system, thereby implementing functions such as charging, discharging and power consumption management by using the power management system.

Although not shown in the figure, the mobile phone may further include a camera, a Bluetooth module, and the like, which are not further described herein.

In an embodiment of the present disclosure, the processor 1080 included in the terminal further controls and performs a procedure of a multi-person speech separation method performed by the terminal.

Figure 6:
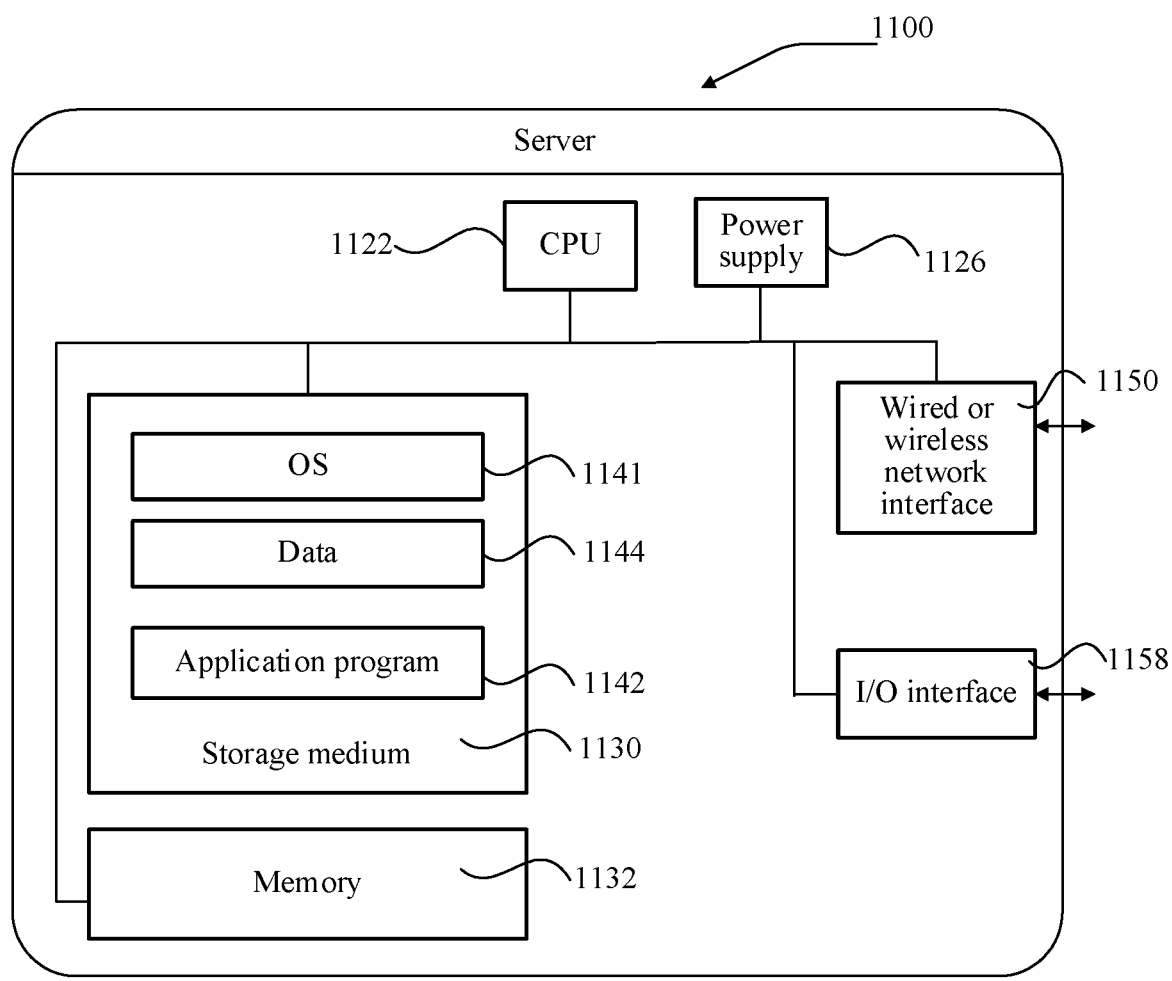
FIG. 6 is a schematic structural diagram of a server to which a multi-person speech separation method is applied according to an embodiment of the present disclosure.

FIG. 6 is a schematic structural diagram of a server according to an embodiment of the present disclosure. The server 1100 may vary greatly due to different configurations or performance, and may include one or more central processing units (CPU) 1122 (for example, one or more processors) and a memory 1132, and one or more storage media 1130 (for example, one or more mass storage devices) that store application programs 1142 or data 1144. The memory 1132 and the storage medium 1130 may be transient storage or permanent storage. The program stored in the storage medium 1130 may include one or more modules (not shown), and each module may include a series of instructions and operations for the server. Still further, the CPU 1122 may be configured to communicate with the storage medium 1130, and perform, on the server 1100, the series of instruction operations in the storage medium 1130.

The server 1100 may further include one or more power supplies 1126, one or more wired or wireless network interfaces 1150, one or more input/output (I/O) interfaces 1158, and/or one or more OSs 1141, for example, Windows Server™, Mac OS X™, Unix™, Linux™ or FreeBSD™.

The steps of the multi-person speech separation method performed by the server in the foregoing embodiment may be based on the server structure shown in FIG. 6.

According to still another aspect of the embodiments of the present disclosure, a storage medium is further provided. The storage medium stores a computer program, the computer program being configured to perform, when being run, steps in any one of the above described embodiments.

Optionally, in one embodiment, the storage medium may be configured to store a computer program used for performing the following steps.

S1. A terminal extracts a hybrid speech feature from a hybrid speech signal requiring separation, N human voices being mixed in the hybrid speech signal, N being a positive integer greater than or equal to 2.

S2. The terminal extracts a masking coefficient of the hybrid speech feature by using a GAN model, to obtain a masking matrix corresponding to the N human voices.

S3. The terminal performs a speech separation on the masking matrix corresponding to the N human voices and the hybrid speech signal by using the GAN model, and outputs N separated speech signals corresponding to the N human voices.

Optionally, in one embodiment, a person of ordinary skill in the art may understand that all or some of the steps of the methods in the embodiments may be implemented by a program by instructing hardware related to a terminal device. The program may be stored in a computer-readable storage medium, and the storage medium may include a flash drive, a read-only memory (ROM), a RAM, a magnetic disk, an optical disc or the like.

In addition, the apparatus embodiment described above is merely schematic. Units described as separate parts may or may not be physically separate, and parts displayed as units may or may not be physical units, may be located in one position, or may be distributed on a plurality of network units. Some or all of the modules may be selected based on an actual requirement, to implement an objective of the solution in one embodiment. In addition, in the accompanying drawings of the apparatus embodiments provided by the present disclosure, connection relationships between modules indicate that the modules have communication connections with each other, which may be specifically implemented as one or more communications buses or signal cables. A person of ordinary skill in the art may understand and implement the present disclosure without creative efforts.

Based on the description of the foregoing implementations, a person skilled in the art may clearly understand that the present disclosure may be implemented by software plus necessary universal hardware, or by dedicated hardware, including a dedicated integrated circuit (IC), a dedicated CPU, a dedicated memory, a dedicated component, and the like. Generally, any functions implemented by a computer program can be easily implemented by using corresponding hardware. Moreover, a specific hardware structure used to achieve the same function may be of various forms, for example, in the form of an analog circuit, a digital circuit or a dedicated circuit. However, for the present disclosure, a software program implementation is a better implementation in most cases. Based on such an understanding, the technical solutions of the present disclosure essentially or the part contributing to the related art may be implemented in the form of a software product. The software product is stored in a readable storage medium, such as a floppy disk, a USB flash drive, a removable hard disk, a ROM, a RAM, a magnetic disk or an optical disc of a computer, and includes several instructions for instructing a computer device (which may be a personal computer, a server, a network device, or the like) to perform the methods described in the embodiments of the present disclosure.

The disclosed embodiments are merely intended for describing the technical solutions of the present disclosure, but not for limiting the present disclosure. Although the present disclosure is described in detail with reference to the disclosed embodiments, it is to be understood by a person of ordinary skill in the art that they may still make modifications to the technical solutions described in these embodiments or make equivalent replacements to some technical features thereof, without departing from the spirit and scope of the technical solutions of the embodiments of the present disclosure.

INDUSTRIAL APPLICABILITY

In one embodiment of the present disclosure, a hybrid speech feature is first extracted from a hybrid speech signal requiring separation, N human voices being mixed in the hybrid speech signal, and a masking coefficient of the hybrid speech feature is then extracted by using a GAN model, to obtain a masking matrix corresponding to the N human voices; and a speech separation is performed on the masking matrix corresponding to the N human voices and the hybrid speech signal by using the GAN model, and N separated speech signals corresponding to the N human voices are outputted. Because the GAN model in the present disclosure can extract the masking matrix corresponding to the N human voices, the GAN model can accurately identify speech signals corresponding to a plurality of human voices, and a speech separation network framework is implemented based on the GAN model, to separate speech from speech in a multi-person speech scenario and improve the performance of speech separation.

What is claimed is:

1. A multi-person speech separation method for a terminal by using a generative adversarial network (GAN) model, the GAN model including a generative network model and a discriminative network model, the method comprising:
obtaining a hybrid speech sample and a clean speech sample from a sample database;
extracting a hybrid speech sample feature from the hybrid speech sample;
extracting a masking coefficient of the hybrid speech sample feature by using the generative network model, to obtain a sample masking matrix;
performing a speech separation on the sample masking matrix and the hybrid speech sample by using the generative network model, and outputting a separated speech sample;
performing alternate training on the generative network model and the discriminative network model by using the separated speech sample, the hybrid speech sample, and the clean speech sample, wherein the alternate training is performed by:
fixing the generative network model during a current time of training of the discriminative network model;
obtaining a loss function of the discriminative network model by using the separated speech sample, the hybrid speech sample, and the clean speech sample;
optimizing the discriminative network model by minimizing the loss function of the discriminative network model;
fixing the discriminative network model during a next time of training of the generative network model;

obtaining a loss function of the generative network model by using the separated speech sample, the hybrid speech sample, and the clean speech sample; and optimizing the generative network model by minimizing the loss function of the generative network model.

2. The method according to claim 1, wherein the obtaining a loss function of the discriminative network model by using the separated speech sample, the hybrid speech sample, and the clean speech sample comprises:

determining a first signal sample combination according to the separated speech sample and the hybrid speech sample, and determining a second signal sample combination according to the clean speech sample and the hybrid speech sample;

performing discriminative output on the first signal sample combination by using the discriminative network model to obtain a first discriminative output result, and obtaining a first distortion metric between the first discriminative output result and a first target output of the discriminative network model;

performing discriminative output on the second signal sample combination by using the discriminative network model to obtain a second discriminative output result, and obtaining a second distortion metric between the second discriminative output result and a second target output of the discriminative network model; and obtaining the loss function of the discriminative network model according to the first distortion metric and the second distortion metric.

3. The method according to claim 1, wherein the extracting a hybrid speech feature from a hybrid speech signal requiring separation comprises:

extracting a time domain feature or a frequency domain feature of a single-channel speech signal from the hybrid speech signal;

extracting a time domain feature or a frequency domain feature of a multi-channel speech signal from the hybrid speech signal;

extracting a single-channel speech feature from the hybrid speech signal; or extracting a correlated feature among a plurality of channels from the hybrid speech signal.

4. The method according to claim 1, wherein the obtaining a loss function of the generative network model by using the separated speech sample, the hybrid speech sample, and the clean speech sample comprises:

determining a first signal sample combination according to the separated speech sample and the hybrid speech sample;

performing discriminative output on the first signal sample combination by using the discriminative network model to obtain a first discriminative output result, and obtaining a third distortion metric between the first discriminative output result and a second target output of the discriminative network model;

obtaining a fourth distortion metric between the separated speech sample and clean speech; and obtaining the loss function of the generative network model according to the third distortion metric and the fourth distortion metric.

5. The method according to claim 4, wherein the obtaining a fourth distortion metric between the separated speech sample and clean speech comprises:

performing a permutation invariant calculation on the separated speech sample and the clean speech sample to obtain a correspondence result between the separated speech sample and the clean speech sample; and obtaining the fourth distortion metric according to the correspondence result between the separated speech sample and the clean speech sample.

6. The multi-person speech separation method according to claim 1, further comprising:

performing a speech separation on a hybrid speech signal by using the GAN model, the hybrid speed signal including N human voices, N being a positive integer greater than or equal to claim 2.

7. The multi-person speech separation method according to claim 6, wherein performing the speech separation on the hybrid speech signal by using the GAN model comprises:

extracting a hybrid speech feature from the hybrid speech signal;

extracting a masking coefficient of the hybrid speech feature to obtain a masking matrix corresponding to the N human voices; and performing the speech separation on the masking matrix and outputting N separated speech signals corresponding to the N human voices.

8. A multi-person speech separation apparatus, comprising: a memory storing computer program instructions; and a processor coupled to the memory and, when executing the computer program instructions, configured to perform a multi-person speech separation method by using a generative adversarial network (GAN) model, the GAN model including a generative network model and a discriminative network model, the method comprising:

obtaining a hybrid speech sample and a clean speech sample from a sample database;

extracting a hybrid speech sample feature from the hybrid speech sample;

extracting a masking coefficient of the hybrid speech sample feature by using the generative network model, to obtain a sample masking matrix;

performing a speech separation on the sample masking matrix and the hybrid speech sample by using the generative network model, and outputting a separated speech sample;

performing alternate training on the generative network model and the discriminative network model by using the separated speech sample, the hybrid speech sample, and the clean speech sample, wherein the alternate training is performed by:

fixing the generative network model during a current time of training of the discriminative network model;

obtaining a loss function of the discriminative network model by using the separated speech sample, the hybrid speech sample, and the clean speech sample;

optimizing the discriminative network model by minimizing the loss function of the discriminative network model;

fixing the discriminative network model during a next time of training of the generative network model;

obtaining a loss function of the generative network model by using the separated speech sample, the hybrid speech sample, and the clean speech sample; and optimizing the generative network model by minimizing the loss function of the generative network model.

9. The apparatus according to claim 8, wherein the obtaining a loss function of the discriminative network model by using the separated speech sample, the hybrid speech sample, and the clean speech sample comprises:
   determining a first signal sample combination according to the separated speech sample and the hybrid speech sample, and determining a second signal sample combination according to the clean speech sample and the hybrid speech sample;
   performing discriminative output on the first signal sample combination by using the discriminative network model to obtain a first discriminative output result, and obtaining a first distortion metric between the first discriminative output result and a first target output of the discriminative network model;
   performing discriminative output on the second signal sample combination by using the discriminative network model to obtain a second discriminative output result, and obtaining a second distortion metric between the second discriminative output result and a second target output of the discriminative network model; and
   obtaining the loss function of the discriminative network model according to the first distortion metric and the second distortion metric.

10. The apparatus according to claim 8, wherein the extracting a hybrid speech feature from a hybrid speech signal requiring separation comprises:
   extracting a time domain feature or a frequency domain feature of a single-channel speech signal from the hybrid speech signal;
   extracting a time domain feature or a frequency domain feature of a multi-channel speech signal from the hybrid speech signal;
   extracting a single-channel speech feature from the hybrid speech signal; or
   extracting a correlated feature among a plurality of channels from the hybrid speech signal.

11. The apparatus according to claim 8, wherein the obtaining a loss function of the generative network model by using the separated speech sample, the hybrid speech sample, and the clean speech sample comprises:
   determining a first signal sample combination according to the separated speech sample and the hybrid speech sample;
   performing discriminative output on the first signal sample combination by using the discriminative network model to obtain a first discriminative output result, and obtaining a third distortion metric between the first discriminative output result and a second target output of the discriminative network model;
   obtaining a fourth distortion metric between the separated speech sample and clean speech; and
   obtaining the loss function of the generative network model according to the third distortion metric and the fourth distortion metric.

12. The apparatus according to claim 11, wherein the obtaining a fourth distortion metric between the separated speech sample and clean speech comprises:
   performing a permutation invariant calculation on the separated speech sample and the clean speech sample to obtain a correspondence result between the separated speech sample and the clean speech sample; and
   obtaining the fourth distortion metric according to the correspondence result between the separated speech sample and the clean speech sample.

13. A non-transitory computer-readable storage medium storing computer program instructions executable by at least one processor to perform a multi-person speech separation method by using a generative adversarial network (GAN) model, the GAN model including a generative network model and a discriminative network model, the method comprising:
   obtaining a hybrid speech sample and a clean speech sample from a sample database;
   extracting a hybrid speech sample feature from the hybrid speech sample;
   extracting a masking coefficient of the hybrid speech sample feature by using the generative network model, to obtain a sample masking matrix corresponding to the N human voices;
   performing a speech separation on the sample masking matrix and the hybrid speech sample by using the generative network model, and outputting a separated speech sample; and
   performing alternate training on the generative network model and the discriminative network model by using the separated speech sample, the hybrid speech sample, and the clean speech sample, wherein the alternate training is performed by:
      fixing the generative network model during a current time of training of the discriminative network model;
      obtaining a loss function of the discriminative network model by using the separated speech sample, the hybrid speech sample, and the clean speech sample;
      optimizing the discriminative network model by minimizing the loss function of the discriminative network model;
      fixing the discriminative network model during a next time of training of the generative network model;
      obtaining a loss function of the generative network model by using the separated speech sample, the hybrid speech sample, and the clean speech sample; and
      optimizing the generative network model by minimizing the loss function of the generative network model.

14. The non-transitory computer-readable storage medium according to claim 13, wherein the obtaining a loss function of the discriminative network model by using the separated speech sample, the hybrid speech sample, and the clean speech sample comprises:
   determining a first signal sample combination according to the separated speech sample and the hybrid speech sample, and determining a second signal sample combination according to the clean speech sample and the hybrid speech sample;
   performing discriminative output on the first signal sample combination by using the discriminative network model to obtain a first discriminative output result, and obtaining a first distortion metric between the first discriminative output result and a first target output of the discriminative network model;
   performing discriminative output on the second signal sample combination by using the discriminative network model to obtain a second discriminative output result, and obtaining a second distortion metric between the second discriminative output result and a second target output of the discriminative network model; and obtaining the loss function of the discriminative network model according to the first distortion metric and the second distortion metric.

15. The non-transitory computer-readable storage medium according to claim 13, wherein the obtaining a loss function of the generative network model by using the separated speech sample, the hybrid speech sample, and the clean speech sample comprises:
   determining a first signal sample combination according to the separated speech sample and the hybrid speech sample;
   performing discriminative output on the first signal sample combination by using the discriminative network model to obtain a first discriminative output result, and obtaining a third distortion metric between the first discriminative output result and a second target output of the discriminative network model;
   obtaining a fourth distortion metric between the separated speech sample and clean speech; and
   obtaining the loss function of the generative network model according to the third distortion metric and the fourth distortion metric.

16. The non-transitory computer-readable storage medium according to claim 15, wherein the obtaining a fourth distortion metric between the separated speech sample and clean speech comprises:
   performing a permutation invariant calculation on the separated speech sample and the clean speech sample to obtain a correspondence result between the separated speech sample and the clean speech sample; and
   obtaining the fourth distortion metric according to the correspondence result between the separated speech sample and the clean speech sample.

* * * * *